(12) United States Patent
Kim et al.

(10) Patent No.: US 11,038,735 B2
(45) Date of Patent: Jun. 15, 2021

(54) METHOD AND APPARATUS FOR TRANSMITTING REFERENCE SIGNAL FOR FREQUENCY OFFSET ESTIMATION IN NEW WIRELESS COMMUNICATION SYSTEM

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 67 days.

(21) Appl. No.: 16/340,096

(22) PCT Filed: Sep. 28, 2017

(86) PCT No.: PCT/KR2017/010863
§ 371 (c)(1),
(2) Date: Apr. 5, 2019

(87) PCT Pub. No.: WO2018/066899
PCT Pub. Date: Apr. 12, 2018

(65) Prior Publication Data
US 2020/0059393 A1 Feb. 20, 2020

(30) Foreign Application Priority Data

Oct. 7, 2016 (KR) .......................... 10-2016-0130101
Sep. 26, 2017 (KR) .......................... 10-2017-0124261

(51) Int. Cl.
*H04L 27/26* (2006.01)
*H04L 5/00* (2006.01)
(Continued)

(52) U.S. Cl.
CPC ........ *H04L 27/2675* (2013.01); *H04L 5/0048* (2013.01); *H04L 27/0014* (2013.01);
(Continued)

(58) Field of Classification Search
CPC .............. H04L 27/2675; H04L 5/0048; H04L 27/0014; H04L 27/2607; H04L 27/2611;
(Continued)

(56) References Cited

U.S. PATENT DOCUMENTS 9,094,906 B2 * 7/2015 Guey ................... H04W 56/00
10,250,380 B2 * 4/2019 Ly ......................... H04W 48/16
(Continued)

OTHER PUBLICATIONS

Samsung, "Discussion on sync. signal considering forward compatibility aspects", R1-166744, 3GPP TSG RAN WG1 #86, Gothenburg, Sweden, Aug. 22-26, 2016, pp. 1-4.
(Continued)

*Primary Examiner* — Brian T O Connor
(74) *Attorney, Agent, or Firm* — Invenstone Patent, LLC

(57) ABSTRACT

Provided are a configuration method and a transmission method of a new reference signal for frequency offset estimation in a novel wireless communication system. The method may include configuring a synchronization signal to be transmitted through a first bandwidth part of one or more bandwidth parts configured by dividing an entire bandwidth into one or more parts, allocating the one or more reference signals for estimating the frequency offset on one or more resources other than a resource for configuring the synchronization signal, and transmitting the one or more reference signals for estimating the frequency offset.

15 Claims, 15 Drawing Sheets

(51) Int. Cl.
*H04L 27/00* (2006.01)
*H04J 11/00* (2006.01)

(52) U.S. Cl.
CPC ...... *H04L 27/2607* (2013.01); *H04L 27/2611* (2013.01); *H04L 27/2657* (2013.01); *H04J 11/0076* (2013.01); *H04J 2211/005* (2013.01); *H04L 27/2649* (2013.01); *H04L 2027/0026* (2013.01); *H04L 2027/0073* (2013.01)

(58) Field of Classification Search
CPC ............. H04L 27/2657; H04L 27/2649; H04L 2027/0026; H04L 2027/0073; H04L 7/00; H04L 5/005; H04J 2211/005; H04J 11/0076
See application file for complete search history.

(56) References Cited

U.S. PATENT DOCUMENTS

| | | | | |
|---|---|---|---|---|
| 10,505,685 | B2* | 12/2019 | Akkarakaran | H04L 5/0035 |
| 10,623,161 | B2* | 4/2020 | Åstrom | H04W 56/0015 |
| 2013/0121246 | A1* | 5/2013 | Guey | H04L 27/2686 370/328 |
| 2013/0229953 | A1 | 9/2013 | Nam et al. | |
| 2015/0055574 | A1 | 2/2015 | Kim et al. | |
| 2016/0105871 | A1* | 4/2016 | Kwak | H04W 56/0015 370/336 |
| 2016/0142989 | A1 | 5/2016 | Hashemi et al. | |
| 2017/0094621 | A1* | 3/2017 | Xu | H04L 47/125 |
| 2017/0149598 | A1 | 5/2017 | Kim et al. | |
| 2017/0202014 | A1* | 7/2017 | Moon | H04L 47/824 |
| 2017/0264412 | A1* | 9/2017 | Chen | H04L 5/0048 |
| 2018/0048413 | A1* | 2/2018 | Liu | H04W 48/18 |
| 2018/0102807 | A1* | 4/2018 | Chen | H04L 25/03821 |
| 2019/0036662 | A1* | 1/2019 | Hessler | H04L 5/0048 |
| 2019/0239175 | A1* | 8/2019 | Kim | H04W 56/001 |
| 2019/0327012 | A1* | 10/2019 | Park | H04W 76/11 |

OTHER PUBLICATIONS

Samsung, "Time and frequency tracking on new carrier type", R1-120163, 3GPP TSG RAN WG1 Meeting #68, Dresden, Germany, Feb. 6-10, 2012, pp. 1-4.

Qualcomm Incorporated, "PBCH Repetition for MTC", R1-153851, 3GPP TSG RAN WG1 #82, Beijing, China, Aug. 24-28, 2015, pp. 1-3.

Samsung, "Discussions on reference signal design for NR", R1-166760, 3GPP TSG RAN WG1 Meeting #86, Gothenburg, Sweden Aug. 22-26, 2016, pp. 1-5.

Motorola Mobility, "Synchronization signal in NR", R1-1609917, 3GPP TSG RAN WG1 Meeting #86bis, Lisbon, Portugal, Oct. 10-14, 2016, pp. 1-5.

European Patent Office, European Search Report of corresponding EP Patent Application No. 17858693.9, dated Apr. 21, 2020.

Qualcomm Incorporated, "Single beam synchronization design", R1-1610156, 3GPP TSG-RAN WG1 #86b, Berlin, Sep. 10-14, 2016, Lisbon, Portugal.

CMCC, "General views on reference signal design", R1-164892, 3GPP TSG RAN WG1 Meeting #85, Nanjing, China May 23-27, 2016.

* cited by examiner

METHOD AND APPARATUS FOR TRANSMITTING REFERENCE SIGNAL FOR FREQUENCY OFFSET ESTIMATION IN NEW WIRELESS COMMUNICATION SYSTEM

CROSS REFERENCE TO RELATED APPLICATIONS

This application is a National Stage Patent Application of PCT International Patent Application No. PCT/KR2017/010863 (filed on Sep. 28, 2017) under 35 U.S.C. § 371, which claims priority to Korean Patent Application Nos. 10-2016-0130101 (filed on Oct. 7, 2016) and 10-2017-0124261 (filed on Sep. 26, 2017), the teachings of which are incorporated herein in their entireties by reference.

TECHNICAL FIELD

The present disclosure relates to methods and apparatuses configuring and transmitting a new reference signal for estimating a frequency offset in new wireless communication systems.

BACKGROUND ART

Recently, the 3rd generation partnership project (3GPP) has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR).

It is required to design the NR to improve a data transmission rate as compared with the long term evolution (LTE)/LTE-Advanced and to meet various requirements required in detailed and specific usage scenarios.

For example, enhanced mobile broadband (eMBB), massive machine type communication (mMTC), and ultra reliable and low latency communication (URLLC) are proposed as representative usage scenarios of the NR. In order to meet the requirements of the individual scenarios, it is required to design the NR as flexible frame structures, compared with the LTE/LTE-Advanced.

Since each usage scenario imposes different requirements for data rates, latency, coverage, etc., there is a growing need for techniques of efficiently multiplexing radio resource units based on numerologies (e.g., a subcarrier spacing (SCS), a subframe, a transmission time interval (TTI), etc.) different from one another, in order to efficiently satisfy requirements for each usage scenario.

In addition, in the NR, it is expected that a synchronization signal will be restricted to some narrowbands and then transmitted in order to support flexible numerology and reduce signal overhead, and it is considered to design a system that avoids great system losses such as a common reference signal (CRS).

Accordingly, in a new frame structure such as the NR, it is required to design a new reference signal capable of supporting a flexible numerology.

DETAILED DESCRIPTION OF THE INVENTION

Technical Problem

One object of at least one embodiment of the present disclosure is to provide a reference signal capable of supporting a flexible numerology in the NR with a new frame structure. In addition, another object of at least one embodiment of the present disclosure is to provide a structure and a pattern of a reference signal capable of estimating a frequency offset using the reference signal.

Technical Solution

In accordance with one aspect of the present disclosure, a method is provided for transmitting one or more reference signals for estimating a frequency offset in a new wireless communication system. The method includes configuring a synchronization signal to be transmitted through a first bandwidth part of one or more bandwidth parts configured by dividing an entire bandwidth into one or more parts, allocating the one or more reference signals for estimating the frequency offset to one or more resources other than a resource for configuring the synchronization signal, and transmitting the one or more reference signals for estimating the frequency offset.

In accordance with another aspect of the present disclosure, a method is provided for receiving one or more reference signals for estimating a frequency offset in a new wireless communication system. The method includes receiving a synchronization signal transmitted through a first bandwidth part of one or more bandwidth parts configured by dividing an entire bandwidth into one or more parts, receiving the one or more reference signals for estimating the frequency offset through one or more resources other than a resource for configuring the synchronization signal, and estimating the frequency offset using the one or more reference signals for estimating the frequency offset.

In accordance with another aspect of the present disclosure, provided is a base station for transmitting one or more reference signals for estimating a frequency offset in a new wireless communication system. The base station includes a controller configured to configure a synchronization signal to be transmitted through a first bandwidth part of one or more bandwidth parts configured by dividing an entire bandwidth into one or more parts and allocate the one or more reference signals for estimating the frequency offset to one or more resources other than a resource for configuring the synchronization signal, and a transmitter configured to transmit the one or more reference signals for estimating the frequency offset.

In accordance with another aspect of the present disclosure, provided is a user equipment for receiving one or more reference signals for estimating a frequency offset in a new wireless communication system. The user equipment includes a receiver configured to receive a synchronization signal transmitted through a first bandwidth part of one or more bandwidth parts configured by dividing an entire bandwidth into one or more parts and receive the one or more reference signals for estimating the frequency offset through one or more resources other than a resource for configuring the synchronization signal, and a controller configured to estimate the frequency offset using the one or more reference signals for estimating the frequency offset.

Effects of the Invention

In accordance with at least one embodiment of the present disclosure, a method is provided for configuring and transmitting a new reference signal for estimating a frequency offset in the NR supporting a flexible frame structure.

BEST MODE FOR CARRYING OUT THE INVENTION

Figure 1:
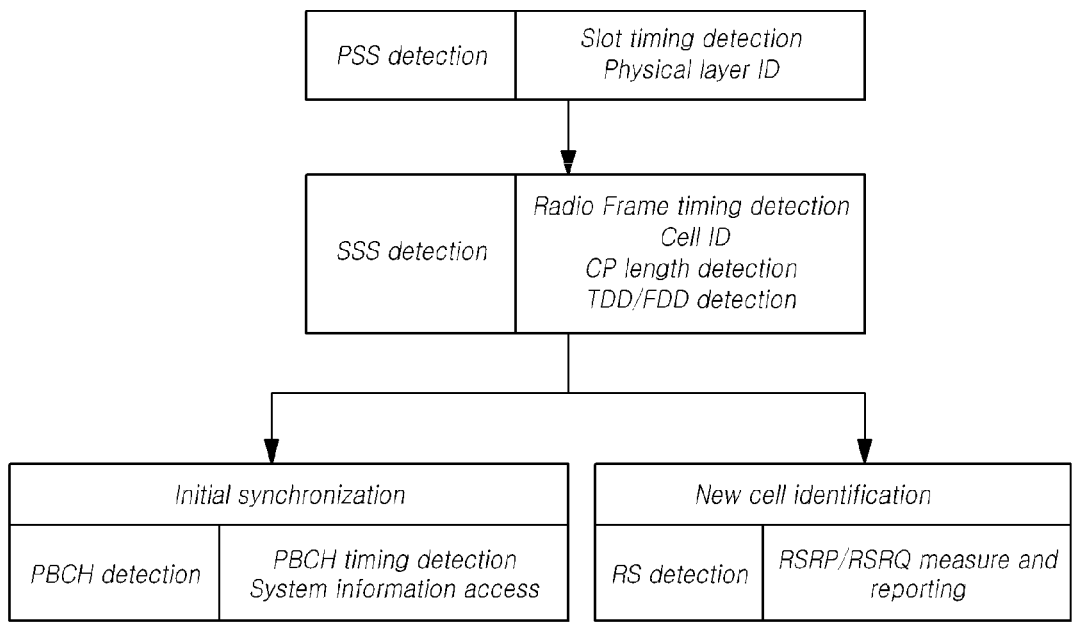
FIG. 1 is a diagram illustrating information obtained at each step of a cell search procedure for connecting to a wireless communication system.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

A base station or a cell generally refers to a station communicating with a user equipment. The base station or cell is defined as a generic term including, but not limited to, all of various coverage areas such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

The various cells described above is controlled by a base station, therefore the base station may be classified into two categories. 1) The base station may be referred to an apparatus that provides a megacell, a macrocell, a microcell, a picocell, a femtocell, and a small cell, in association with a radio area, or 2) the base station may be referred to a radio area itself. The former base station may be referred to all apparatuses providing any radio area, which are controlled by the same entity, or which interact to configure the radio area in cooperation with one another. According to methods of establishing a radio area, an example of the base station may be a point, a transmission/reception point, a transmission point, a reception point, or the like. The latter base station may be a radio area itself for enabling a user equipment to receive signals from or transmit signals to a user equipment or a neighboring base station.

In the present disclosure, the cell may refer to a coverage of a signal transmitted from a transmission/reception point, a component carrier having the coverage of a signal transmitted from a transmission point or a transmission/reception point, or a transmission/reception point itself.

The user equipment and the base station of the present disclosure are two entities for performing transmission/reception used to embody the technology and technical spirit described in the present specification. The UE and the BS are defined as a generic term and not limited to specific terms or words.

The uplink (UL) refers to data transmission/reception from a user equipment to a base station, and the downlink (DL) refers to data transmission/reception from a base station to a user equipment.

UL transmission and DL transmission may be performed by utilizing i) a time division duplex (TDD) technique performing transmission through different time slots, ii) a frequency division duplex (FDD) technique performing transmission through different frequencies, or iii) a hybrid technique of the frequency division duplex (FDD) and the time division duplex (TDD).

Further, in the wireless communication system, a standard is specified by configuring the UL and the DL based on a single carrier or a pair of carriers.

The UL and the DL transmit control information through one or more control channels, such as a physical DL control channel (PDCCH), a physical UL control channel (PUCCH), and the like, and transmit data through one or more data channels, such as a physical DL shared channel (PDSCH), a physical UL shared channel (PUSCH), and the like.

The DL may denote communication or a communication path from multiple transmission/reception points to a user equipment, and the UL may denote communication or a communication path from the user equipment to the multiple transmission/reception points. In the DL, a transmitter may be a part of multiple transmission/reception points, and a receiver may be a part of a user equipment. In the UL, a transmitter may be a part of a user equipment and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

Meanwhile, higher layer signaling described below includes radio resource control (RRC) signaling transmitting RRC information containing an RRC parameter.

The base station performs DL transmission to user equipments. The base station may transmit a physical DL control channel for transmitting i) DL control information, such as scheduling required to receive a DL data channel that is a primary physical channel for unicast transmission, and ii) scheduling approval information for transmission through an UL data channel. Hereinafter, transmitting/receiving a signal through each channel will be described in such a manner that a corresponding channel is transmitted/received.

Any of multiple access techniques may be applied to the wireless communication system, and therefore no limitation is imposed on them. The wireless communication system may use various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

At least one embodiment of the present disclosure may be applied to resource allocation in i) asynchronous wireless communication evolving into LTE/LTE-advanced and IMT-2020 from GSM, WCDMA, and HSPA, and ii) synchronous wireless communication evolving into CDMA, CDMA-2000, and UMB.

A machine type communication (MTC) terminal of the present disclosure may refer to a terminal supporting low costs (or low complexity), a terminal supporting coverage enhancement, or the like. As another example, the MTC terminal of the present disclosure may refer to a terminal defined as a predetermined category for supporting low cost (or low complexity) and/or coverage enhancement.

In other words, in the present disclosure, the MTC terminal may refer to a low cost (or low complexity) user equipment (UE) category/type newly defined in 3GPP Release-13 and performing LTE-based MTC-related operations. In the present disclosure, the MTC terminal may refer to a UE category/type defined in or before 3GPP Release-12, which supports enhanced coverage in comparison with the typical LTE coverage or supports low power consumption, or may refer to a low cost (or low complexity) UE category/type newly defined in Release-13. The MTC terminal may refer to a further enhanced MTC terminal defined in Release-14.

A narrowband Internet of Things (NB-IoT) terminal of the present disclosure refers to a terminal supporting radio access for cellular IoT. NB-IoT technology aims for improving indoor coverage, supporting for large-scale low-speed terminals, low latency sensitivity, very low terminal costs, low power consumption, and optimizing a network architecture.

An enhanced mobile broadband (eMBB), massive machine-type communication (mMTC), and ultra reliable and low latency communication (URLLC) are proposed as representative usage scenarios for NR on which discussions are in progress in the 3GPP.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

[Legacy Synchronization: PSS/SSS]

FIG. 1 is a diagram illustrating information obtained at each step of a cell search procedure for connecting to a wireless communication system.

Referring to FIG. 1, a UE is required to perform a cell search procedure in order to attach to an LTE/LTE-Advanced cell. The cell search procedure includes a synchronization process of a series of actions for allowing the UE to determine time/frequency parameters. Through the synchronization process, the UE may be enabled to demodulate a DL signal and transmit an UL signal at a proper time.

The cell search procedure of the typical LTE/LTE-Advanced system includes an initial synchronization and a new cell identification.

The initial synchronization is to decode all information required in order for a UE to detect an LTE/LTE-Advanced cell first and then camp on that cell. It is performed when the UE is powered on or disconnected from a serving cell.

The new cell identification is performed in the process of detecting a new neighboring cell by the UE in a state where the UE has been attached to the LTE/LTE-Advanced cell, and the UE reports measurements related to the new cell to perform a handover to a serving cell.

An eNB in each or every cell transmits two physical channels, namely, a primary synchronization signal (PSS) and a secondary synchronization signal (SSS), and the UE detects the PSS and the SSS prior to the cell search procedure (the initial synchronization, the new cell identification).

When the UE detects the PSS and SSS signals, the UE may be enabled to perform time and frequency synchronization to identify a physical cell ID (PCID) and a cyclic prefix (CP) length, and to obtain information on which of the FDD and TDD techniques the corresponding cell uses.

Initial synchronization: When a synchronization signal is detected, the UE may decode a physical broadcast channel (PBCH) and obtain system information, such as a DL system bandwidth, or the like, based on the result of the decoding.

New cell identification: The UE, without decoding the PBCH, measures the signal quality of a newly-detected cell based on reference signals (RS) and reports the measurements to a serving cell (The LTE/LTE-Advanced is designed to enable RSRP to be measured/received without decoding the PBCH.)

The synchronization signal is transmitted twice every radio frame of 10 ms, and the PSS and the SSS have different structures depending on whether the UE is connected to a FDD cell or a TDD cell.

Figure 2:
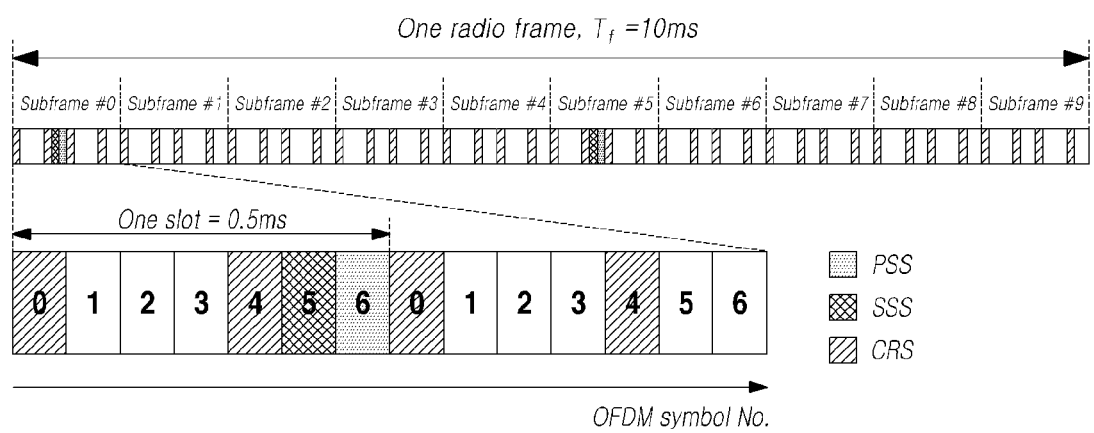
FIG. 2 is a diagram illustrating a frame structure of a primary synchronization signal (PSS) and a secondary synchronization signal (SSS) in frequency division duplex (FDD).
Figure 3:
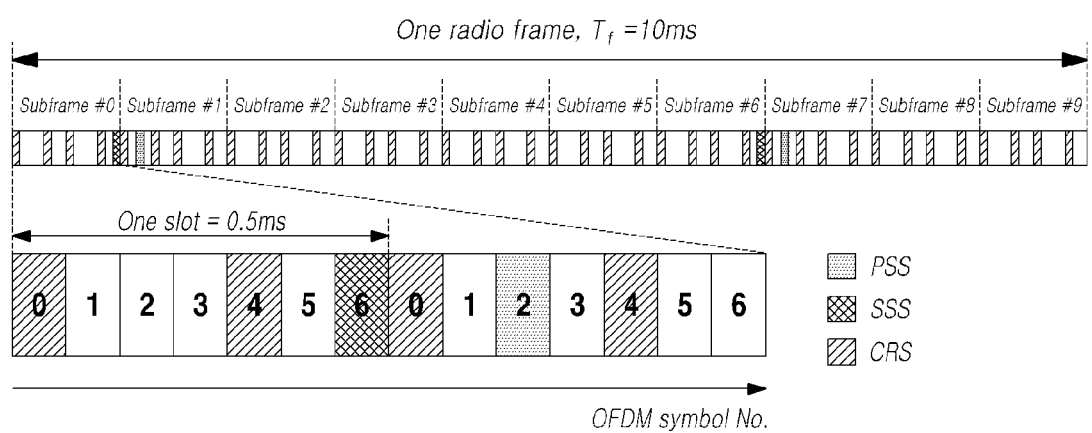
FIG. 3 is a diagram illustrating a frame structure of the primary synchronization signal (PSS) and the secondary synchronization signal (SSS) in time division duplex (TDD).

FIG. 2 shows a frame structure of the PSS and the SSS in FDD, and FIG. 3 shows a frame structure of the PSS and the SSS in TDD.

Referring to FIGS. 2 and 3, in a FDD cell, the PSS is located in the last OFDM symbol of a first slot and in the last OFDM symbol of an eleventh symbol in a radio frame of 10 ms. Each slot is made up of 6 or 7 OFDM symbols according to the length of a cyclic prefix (CP). Since the PSS is located in the last symbol of the slot, the UE can obtain information on a slot boundary timing regardless of the length of the CP.

The SSS is located in a symbol prior to the PSS, and assuming that radio channel characteristics are constant over a longer time than the length of the OFDM symbol, it is possible to coherently detect the SSS based on the PSS.

In a TDD cell, the PSS is located in a third OFDM symbol of each of a third slot and in a third OFDM symbol of a thirteenth slot, and the SSS is located prior to three OFDM symbols relative to the PSS. In this case, assuming that a coherence time of a channel is sufficiently longer than four OFDM symbols, it is possible to coherently detect the SSS.

The precise location of the SSS is changed according to the length of a CP selected in a corresponding cell. Since the UE does not know the length of the CP in advance when the cell is detected, the UE may be enabled to identify and detect two possible SSS locations for each of a normal CP and an extended CP. When searching all of FDD and TDD cells, it is necessary for the UE to check a total of four possible SSS locations.

The PSS in a specific cell is the same in all frames, while sequences of two SSSs in each radio frame are different from each other. Accordingly, the UE can recognize the radio frame boundary of 10 ms using information on the SSSs.

Figure 4:
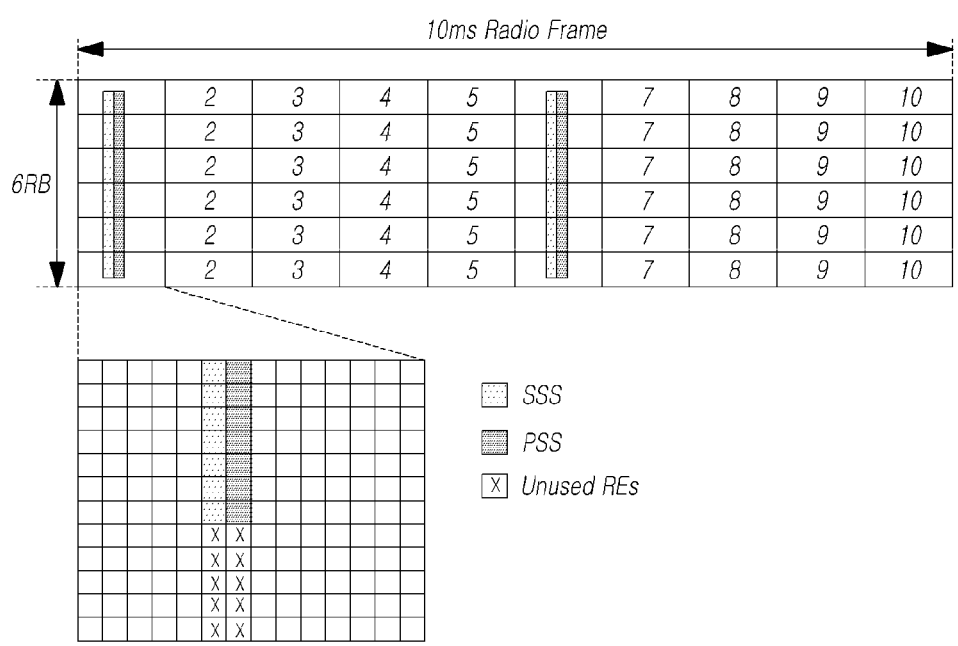
FIG. 4 is a diagram illustrating a frame structure of the primary synchronization signal (PSS) and the secondary synchronization signal (SSS) in a frequency-time domain in a FDD cell.

FIG. 4 shows is frame structures of the PSS and the SSS in the frequency-time domain of an FDD cell.

Referring to FIG. 4, the PSS and the SSS are mapped to subcarriers of center 6 resource blocks (RB) in the frequency domain.

The number of RBs ranges from 6 to 110 according to system bandwidths. Since the PSS and the SSS are mapped to center 6 RBs, the UE may detect the PSS and the SSS in the same method, regardless of a bandwidth of a signal transmitted from the eNB. Since each of the PSS and the SSS is sequences made up of 62 symbols, it is mapped to center 62 subcarriers located around a DC subcarrier, and the DC subcarrier is not used.

Accordingly, all resource elements (RE) in center 4 RBs among 6 RBs are used, while 7 REs in 2 RBs located on each side are used and 5 REs are not used. The UE uses a fast Fourier transform (FFT) with the size of 64 to detect the PSS and the SSS, in which a sampling rate is lower compared with a case where 72 subcarriers are used.

The UE may obtain a physical layer cell ID using specific sequences of the PSS and the SSS. The LTE/LTE-Advanced has a total of 504 unique physical layer cell IDs divided into 168 groups, and each group includes three cell Ids, which are allocated to a cell controlled by an identical eNB. Each group is identified by an SSS sequence, and therefore a total of 168 SSS sequences are required to identify each group.

The PSS uses a Zadoff-Chu (ZC) sequence. The ZC sequence is used in a random access preamble and an uplink reference signal, in addition to the PSS.

Three ZC PSSs corresponding to three physical layer IDs of each cell group are used in the LTE/LTE-advanced.

Figure 5:
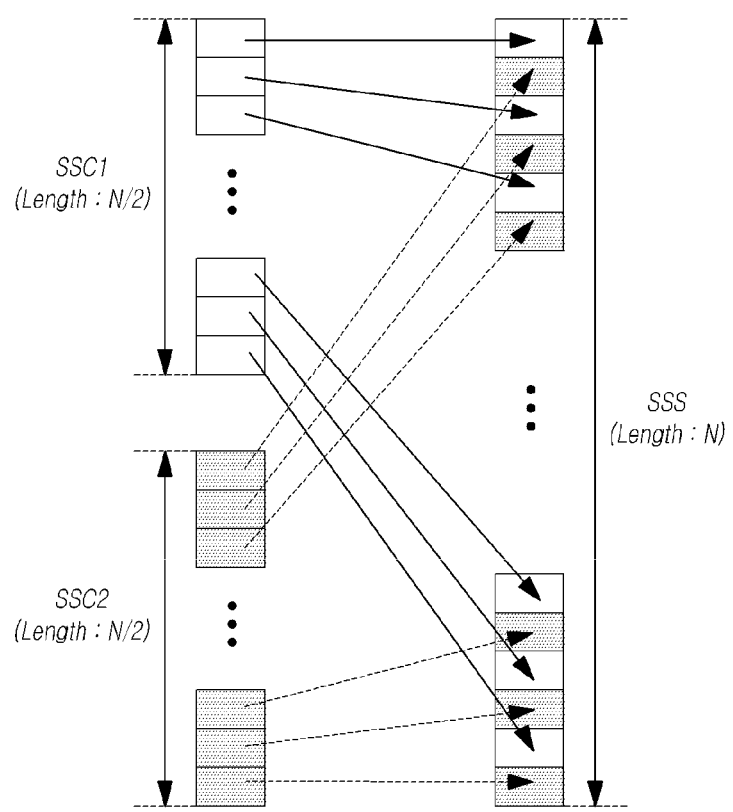
FIG. 5 is a diagram illustrating sequence mapping for the secondary synchronization signal.

FIG. 5 shows SSS sequence mapping.

Referring to FIG. 5, the SSS is configured based on an M-sequence that is a sequence generated by an n shift registers and having the length of 2n−1. Each SSS sequence is generated by i) generating two BPSK modulated synchronization codes (SSC1 and SSC2) each having the length of 31 in the frequency domain, and ii) alternately inserting the two BPSK modulated synchronization codes (SSC1 and SSC2) by an interleaving scheme. The two codes for generating the SSC1 and the SSC2 may be generated by differently cyclic shifting a M-sequence with the length of 31.

In this case, a cyclic shift index is determined by a function of a physical layer cell ID group. The SSC2 is scrambled by a sequence determined by a function of an index of the SSC1, and scrambled once more by a code determined by a function of the PSS.

[5G NR (New Radio)]

Recently, the 3GPP has approved the "Study on New Radio Access Technology", which is a study item for research on next-generation/5G radio access technology. On the basis of the Study on New Radio Access Technology, Radio Access Network Working Group 1 has been discussing frame structures, channel coding and modulation, waveforms, multiple access methods, and the like for the new radio (NR).

It is required to design the NR to improve a data transmission rate as compared with the LTE/LTE-Advanced and to meet various requirements required in detailed and specific usage scenarios.

In particular, enhanced mobile broadband (eMBB), massive machine type communication (mMTC), and ultra reliable and low latency communication (URLLC) are proposed as representative usage scenarios of the NR. In order to meet the requirements of the individual scenarios, it is required to design the NR as flexible frame structures, compared with the LTE/LTE-Advanced.

Specifically, the eMBB, mMTC, URLLC are considered as representative usage scenarios of the NR having been discussed in the 3GPP. Since each usage scenario imposes different requirements for data rates, latency, coverage, etc., there is a growing need for techniques of efficiently multiplexing radio resource units based on numerologies (e.g., a subcarrier spacing (SCS), a subframe, a transmission time interval (TTI), etc.) different from one another, as a method for efficiently satisfying requirements for each usage scenario through a frequency band established in an NR system.

For example, likewise the typical LTE/LTE-Advanced, there is a growing need for supporting through one NR frequency band a 1 ms subframe (or a 0.5 ms slot) structure based on a 15 kHz subcarrier spacing, a 0.5 ms subframe (or a 0.25 ms slot) structure based on a 30 kHz subcarrier spacing, and a 0.25 ms subframe (or a 0.125 ms slot) structure based on a 60 kHz subcarrier spacing.

In addition, discussions are in progress for techniques of i) configuring either a subframe (e.g. X=14 or 7, or any other natural number) made up of X OFDM symbols or a symbol (e.g. Y=14 or 7, or any other natural number) made up of Y OFDM symbols as a resource allocation unit in the time domain, e.g., a scheduling unit in the time domain, in a numerology structure, e.g., a subcarrier spacing, or ii) defining a mini-slot made up of Z OFDM symbols (i.e. any natural number satisfying Z<Y & Z<X) having smaller granularity than the subframe or the slot.

Figure 6:
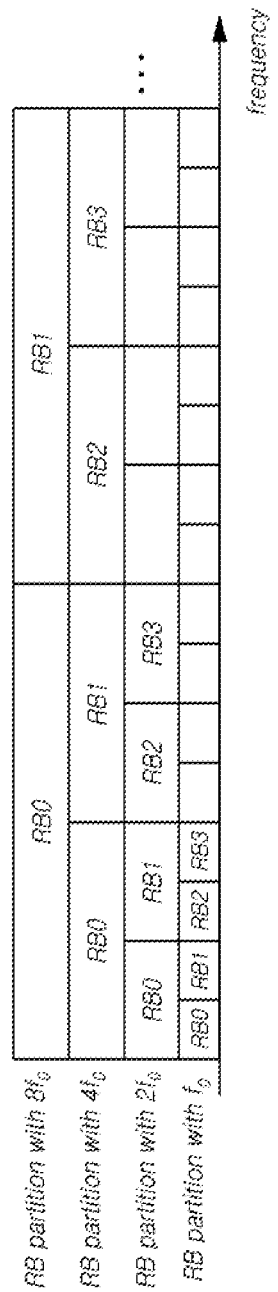
FIG. 6 is a diagram illustrating a resource block structure in a TDM-based mixed numerology.

FIG. 6 is a diagram illustrating a resource block structure in a TDM-based mixed numerology.

As described above, a plurality of numerologies are supported through an NR carrier. For subcarrier spacing of $2^n*15$ kHz for each numerology, it is defined that subcarriers for each numerology are mapped on the subset/superset of those for subcarrier spacing of 15 kHz in a nested manner in the frequency domain.

In addition, in a case where a frame structure is configured by multiplexing corresponding numerologies in TDM manner, RBs serving as a resource allocation unit in the frequency axis through a corresponding NR carrier are defined as the subset/superset of the RB for a 15 kHz-based RB grid in a nested manner, as shown FIG. 6.

In this case, the number of subcarriers composing one RB in each numerology is determined to have one of 12 or 16 regardless of a corresponding numerology.

Meanwhile, there is no new synchronization signal design method suitable for an NR related frame structure. In accordance with at least one embodiment of the present disclosure, methods are proposed for designing a reference signal for estimating a new frequency offset capable of supporting various numerologies of the NR.

Figure 7:
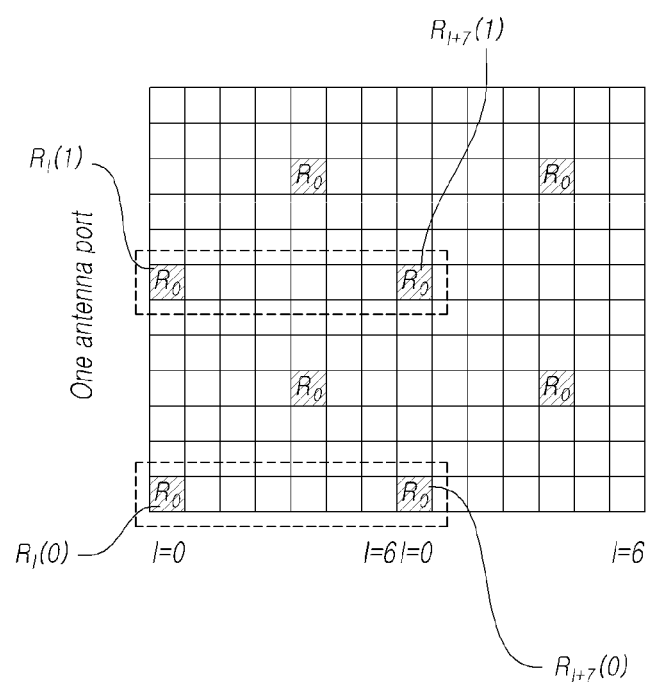
FIG. 7 is a conceptual diagram illustrating sequence correlation for deriving a frequency offset using CRS port 0.

FIG. 7 is a conceptual diagram illustrating sequence correlation for deriving a frequency offset using CRS port 0.

The typical synchronization signal, e.g., the PSS/SSS of the LTE/LTE-Advanced is allocated to center 6 RBs and then transmitted.

Basically, it is possible for a UE to achieve synchronization by just detecting corresponding RBs.

However, such a method does not provide a specific synchronization function, such as an actual phase error. This function is left to an implementation area, and currently, a corresponding residual frequency offset (or phase error) is estimated using one or more ports of the CSR.

For example, when the number of entire sequences of CRS port 0 is NRS, correlation between corresponding mapped two reception sequences is expressed as follows.

$$C_l(j) = R_1^*(j) R_{l+D_s}(j)$$

$R_i(j)$ means the 'j'th reception signal received by the UE in the 'i' th symbol'.

Additionally, $D_s$ means the distance between two consecutive OFDM symbols.

$\rho$ means a normalized OFDM unit length in consideration of the length of the CP, and is represented as follows.

$$\rho = N_e/N$$

$$N_e = N + N_{CP}$$

Here, an equation for finally obtaining the frequency offset by the UE is given as follows.

$$\hat{\gamma} = \frac{1}{2\pi D_s \rho} \arg\left[\sum_{j=1}^{N_{RS}} C_l(j)\right]$$

Here, it has a range of $$|\gamma| \le \frac{N}{2N_e D_s}.$$

Using methods described above, the UE i) achieves synchronization by compensating an initial frequency offset based on the PSS/SSS of center 6 RBs, ii) obtains information on an entire transmission band through the PBCH, and then iii) estimates an additional frequency offset using the CRS port.

This may become a reference signal for precisely configuring synchronization to an entire frequency band, because the CRS is allocated to the entire frequency band and then is transmitted, regardless of configuring a frequency band of the LTE/LTE-Advanced system. In addition, the CRS can provide more precise synchronization acquisition performance due to an RS density higher than that of other reference signals.

Similar to the legacy PSS/SSS, in the NR, namely, the next generation radio access system, it is expected that the synchronization signal will be restricted to some narrowbands and then transmitted. This is because it is possible to have a structure advantageous for supporting flexible numerology and reducing signal overhead. In the NR, it is actually considered to design a system that avoids great system losses such as the CRS.

Accordingly, in accordance with at least one embodiment of the present disclosure, proposed is a new reference signal capable of supporting a flexible numerology in such an NR-related new frame structure. The new reference signal is intended to estimate a residual frequency offset.

In addition, a structure of a new reference signal is proposed, and at the same time, a pattern of the new reference signal capable of adding a function of estimating a frequency offset into a channel estimation/CQI estimation reference signal is proposed, in accordance with embodiments of the present disclosure.

Embodiment 1

When a synchronization signal of a reference numerology band is transmitted, one or more reference signals for estimating a frequency offset are allocated to the remaining band except for a resource for transmitting the synchronization signal.

Figure 8:
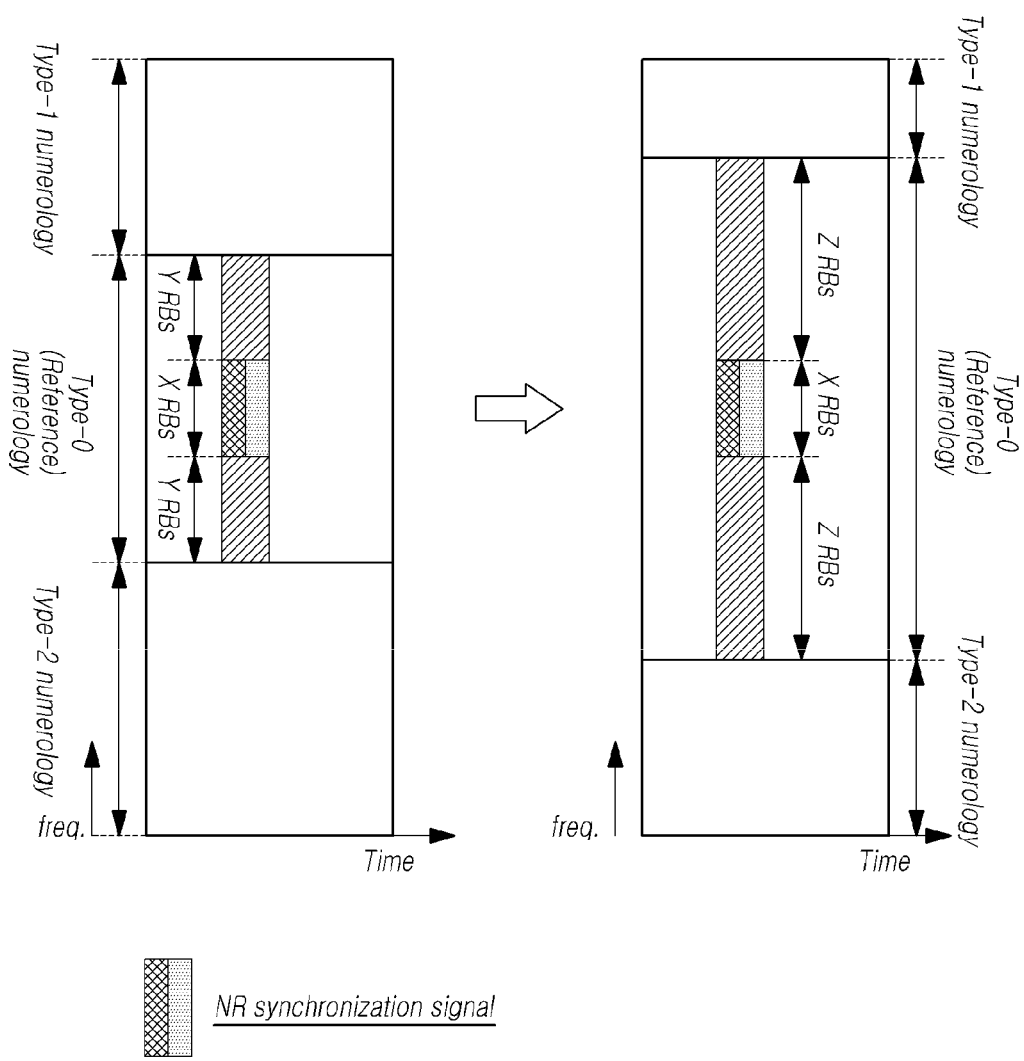
FIGS. 8 and 9 are diagrams illustrating examples of methods of configuring reference signals for estimating a frequency offset in new wireless communication systems according to at least one embodiment of the present disclosure.

In this Embodiment 1, as shown in FIG. 8, reference signals for estimating a frequency offset are allocated to the same time resource area as that in which the synchronization signal is allocated.

That is, the reference signals may be allocated to upper and lower bands of the band of the synchronization signal in FDM manner within a specific symbol interval in which the synchronization signal is transmitted. In addition, the length of the synchronization signal may be flexibly changed according to an allocated bandwidth of each numerology. In this case, the synchronization signal has a structure in which it is disposed on the same subcarrier at a predetermined time interval. In addition, the length of the reference signals may be flexibly configured according to the size of each numerology band.

For example, if the bandwidth is 20, 40, 60, or 80 MHz, the lengths LRs of the reference signals are different from each other according to the size BWx of a corresponding band. In this case, when the same function is used, methods of generating an RS pattern and sequence result in only an RS length LRs, sequence length or pattern length being changed according to the size BWx of the bandwidth.

Embodiment 1-1

One or more reference signals for estimating a frequency offset are allocated to an entire frequency band, and may be configured for each numerology and then transmitted.

In this Embodiment 1-1, it is proposed to configure one or more reference signals for estimating each frequency offset for each numerology, and the corresponding reference signals are basically allocated to the entire frequency band.

For example, as shown in FIG. 8, the length of reference signals is changed from the 2Y RBs to 2Z RBs according to the size of a corresponding band in Type-0 numerology, and the changed reference signals are allocated to the entire band. In addition, these reference signals may be individually configured for each numerology, and the same principle may be applied not only to an FDM structure shown in FIG. 8, but also to a TDM structure or an FDM and TDM structure.

Embodiment 1-2

One or more reference signals for estimating a frequency offset are transmitted in the same time interval as the basic synchronization signal.

This Embodiment 1-2 includes configuring a transmission location of the corresponding reference signals. Since it is assumed that the basic synchronization signal is transmitted through a narrowband (e.g., center 6 RBs in the LTE/LTE- Advanced) on a specific location for each numerology, the basic synchronization signal may be transmitted on the same time location or symbol location as a location on which the synchronization signal is transmitted, as shown in FIG. 8. In this structure, the corresponding reference signals are allocated to the remaining resource except for center X RBs occupied by the synchronization signal.

Embodiment 1-3

One or more reference signals for estimating a frequency offset are transmitted in different time intervals adjacent to the basic synchronization signal.

In this Embodiment 1-3, unlike to Embodiment 2-1, corresponding reference signals are transmitted in different symbol intervals in a transmission location of the basic synchronization signal.

Figure 9:
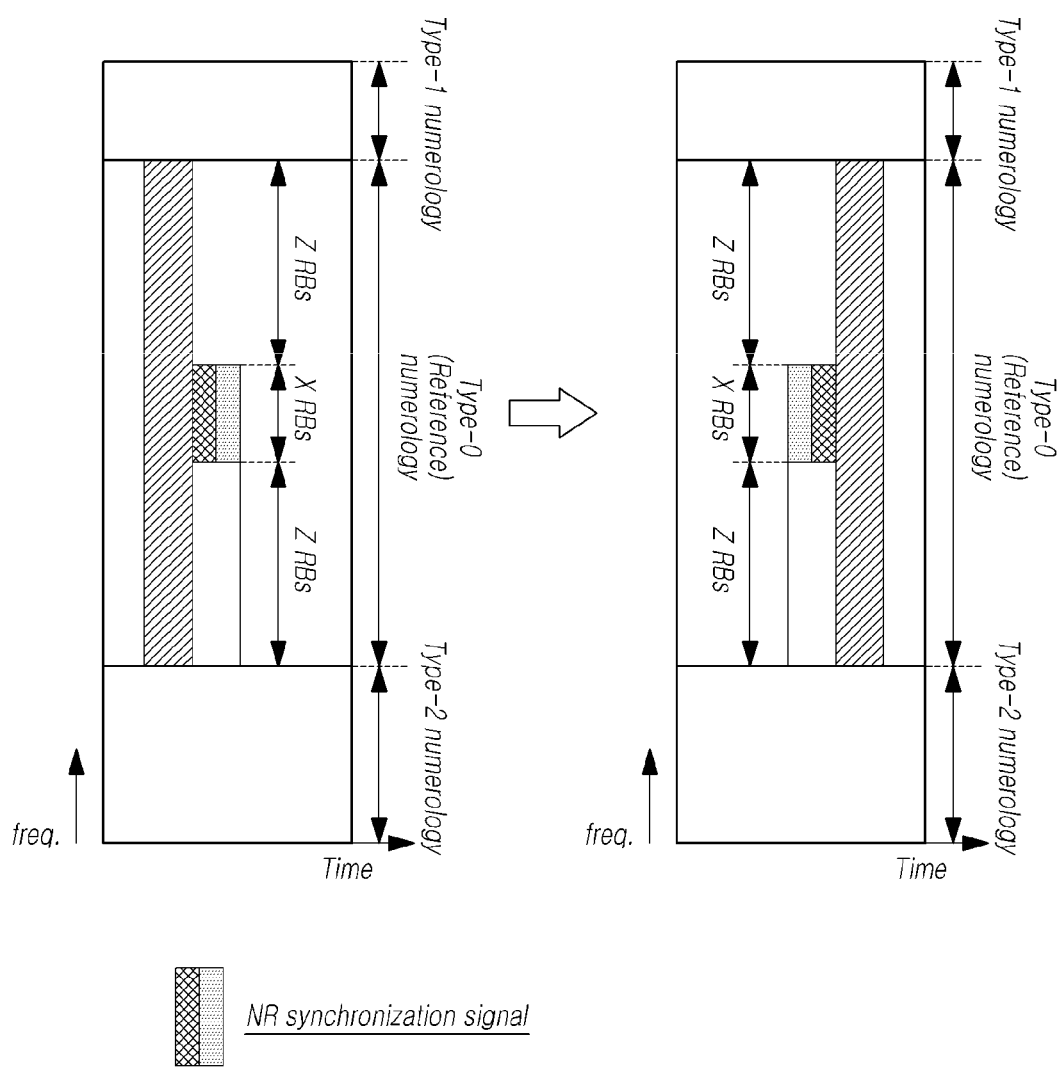

As shown in FIG. 9, one or more locations adjacent to or close to a symbol interval for transmitting the synchronization signal, and in this case, the reference signals may be allocated to the first half symbol interval or the second half symbol interval of the synchronization signal. In this method, the reference signals may be transmitted by including or excluding center X RBs on which the synchronization signal is transmitted.

Embodiment 1-4

One or more reference signals for estimating a frequency offset are allocated to one or more identical subcarriers in different OFDM symbols having an interval shorter than coherence time, and then transmitted.

Figure 10:
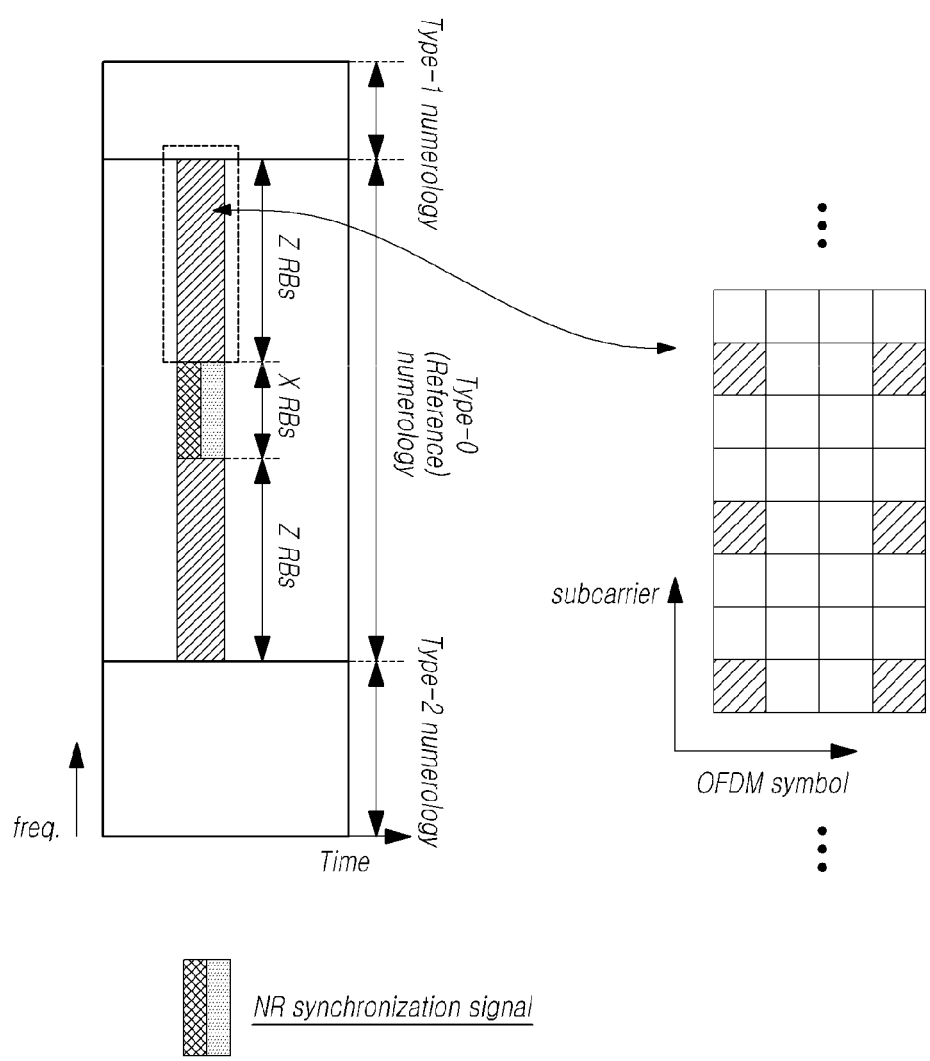
FIG. 10 is a diagram illustrating a pattern of reference signals for estimating a frequency offset in new wireless communication systems according to at least one embodiment of the present disclosure.

This Embodiment 1-4 basically includes configuration methods for an allocation pattern of reference signals. For example, as shown in FIG. 10, the reference signals are allocated to one or more identical subcarrier locations in OFDM symbol intervals different from each other.

Through this, it is possible to estimate a frequency offset using the equation described above. In addition, reference signal patterns are not required to have the same pattern as in FIG. 10. It is possible to be allocated in a staggered pattern in a corresponding time area. In this case, the two reference signals are required to be transmitted on different symbols from each other in one or more identical subcarrier locations.

The coherence time basically means a range in which a channel is static in the time domain. In addition, the coherence time is basically determined by system requirements based on the maximum mobility speed of a UE. If the maximum coherence time is derived as 10 symbols, a time distance between two symbols in a corresponding reference signal pattern cannot exceed 10 symbols.

Embodiment 1-5

One or more reference signals for estimating a frequency offset are allocated in a specific pattern to minimize interference with adjacent cells.

This Embodiment 1-5 is basically a method of distributing interference with an adjacent cell based on a reference signal pattern. Basically, if all eNB (or gNB) transmit reference signals at the same time in the same location, a collision may occur. Therefore, the performance of synchronization acquisition of each cell may be degraded.

The most typical method is interference randomization based on a specific pattern. As an example of the specific pattern, a cell ID-based shift pattern is the most typical method to consider. A UE may directly recognize the corresponding information based on a cell ID when the UE initially accesses through the basic synchronization signal, in the same manner as the LTE/LTE-Advanced.

As another method, an eNB (or gNB) may signal reference signal configuration information for estimating a frequency offset to UEs. The signaling may be performed by broadcasting or utilizing RRC signaling. Since reference signal allocation patterns are different for each numerology, it is required to transmit individual configuration information for each numerology.

Embodiment 2

One or more reference signals for estimating a frequency offset are aligned on a specific location, in an FDM-based multiple numerology structure.

This Embodiment 2 includes a method of configuring a transmission location of one or more frequency offset reference signals between different numerologies. Basically, it is advantageous for transmission locations of reference signals for estimating a frequency offset to be aligned on one or more specific locations rather than to have individual transmission locations for each numerology.

A symbol/minislot/slot/subframe/frame boundary may become an example of the specific location, and the before/after symbols of an aligned boundary point are most suitable for the specific location.

Figure 11:
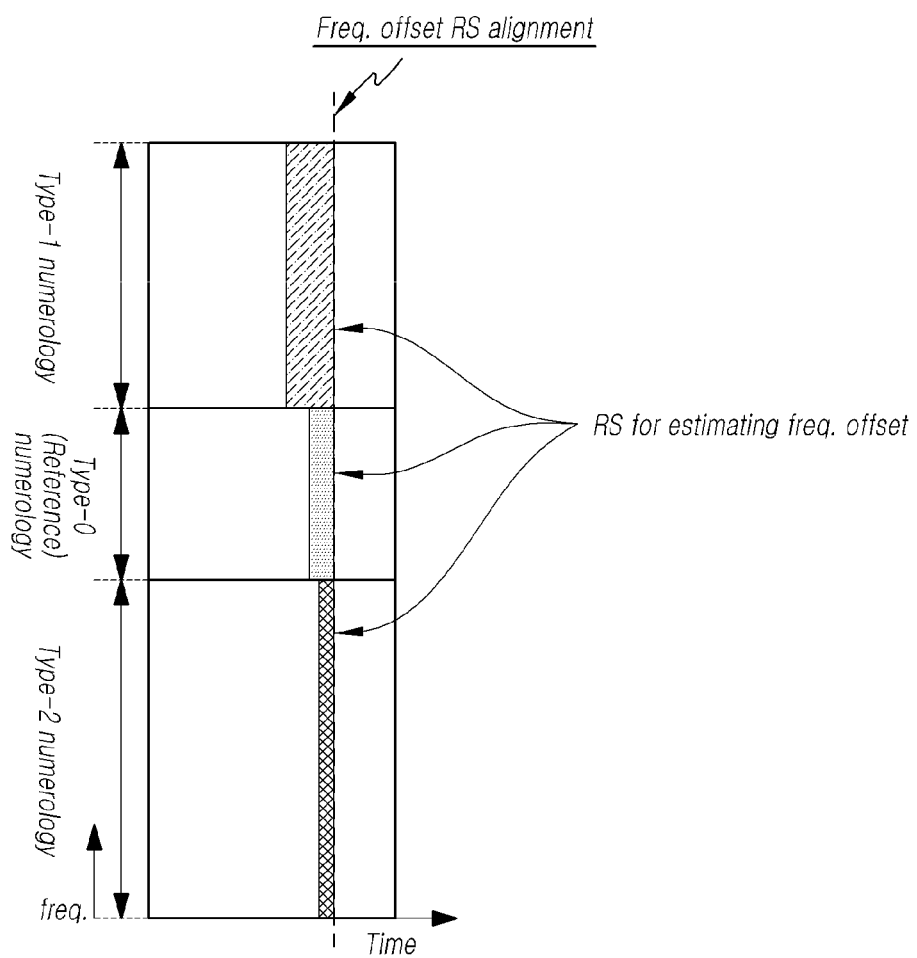
FIG. 11 is a diagram illustrating a concept of the alignment of reference signals for estimating a frequency offset in different bands in new wireless communication systems according to at least one embodiment of the present disclosure.

For example, it is possible to align one or more transmission locations of one or more reference signals for each numerology on the front half of the frame boundary through the configuration as in FIG. 11. In this case, it is not necessary to have the same transmission period for transmitting reference signals for estimating a frequency offset of each numerology. On the contrary, at least when one or more corresponding reference signals are transmitted with the reference numerology, it is necessary that the transmission time points coincide with each other.

Figure 12:
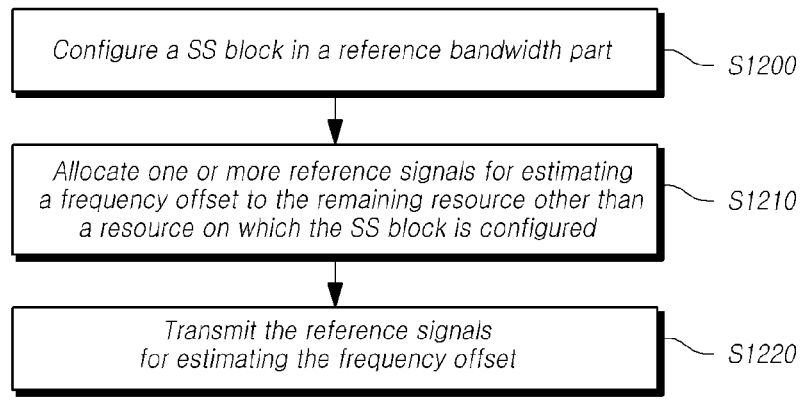
FIGS. 12 and 13 are flowcharts illustrating methods of transmitting and receiving reference signals for estimating a frequency offset in new wireless communication systems according to at least one embodiment of the present disclosure.
Figure 13:
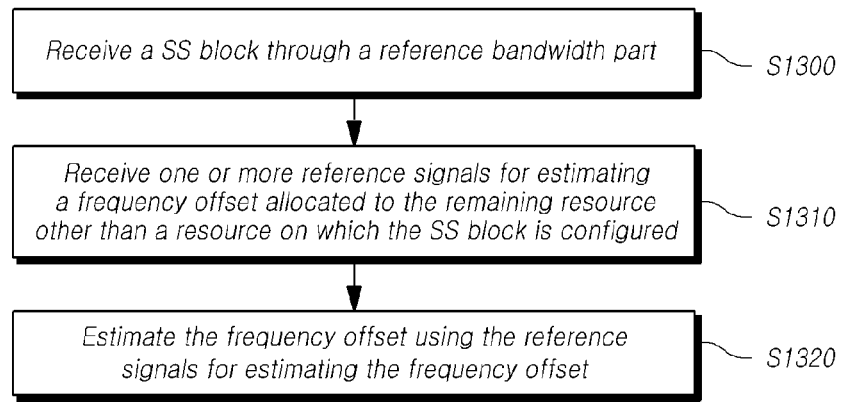

FIGS. 12 and 13 illustrate methods of transmitting and receiving one or more reference signals for estimating a frequency offset in new wireless communication systems according to at least one embodiment of the present disclosure.

Referring to FIG. 12, a base station configures one or more bandwidth parts by dividing an entire bandwidth into one or more parts in new wireless communication systems according to at least one embodiment of the present disclosure. The base station configures a synchronization signal (or a synchronization signal block) in a first bandwidth part for transmitting the synchronization signal among one or more bandwidth parts (S1200).

Here, the first bandwidth part may denote the reference numerology or the Type-0 numerology in the embodiments described above.

The base station may allocate one or more reference signals for estimating a frequency offset to one or more resources other than a resource allocated to the synchronization signal (S1210). The base station transmits the reference signals for estimating the frequency offset to a UE (S1220).

The time length of the reference signals for estimating the frequency offset may be determined based on the bandwidth of one or more bandwidth parts allocated to the reference signals. The base station may allocate the reference signals to the entire band of one or more bandwidth parts allocated to the reference signals.

That is, when the reference signals for estimating the frequency offset are allocated to the same time interval of configuring the synchronization signal configured, the reference signals may be allocated to one or more bands other than a band for configuring the synchronization signal. Alternatively, when the reference signals for estimating the frequency offset are allocated to one or more time intervals adjacent to a time interval for configuring the synchronization signal, the reference signals may be allocated to the entire band of one or more bandwidth parts allocated to the reference signals.

In addition, the base station may allocate the reference signals for estimating the frequency offset to one or more second bandwidth parts of second bandwidth parts other than the first bandwidth part for configuring the synchronization signal. Accordingly, the base station may allocate the reference signals for estimating the frequency offset to one or more resources in one or more second bandwidth parts other than a resource for configuring the synchronization signal in the first bandwidth part.

When the reference signals for estimating the frequency offset are allocated to the second bandwidth parts other than the first bandwidth part, at least one of the location of each start symbol and the location of each last symbol of the reference signals allocated to bandwidth parts different form each other may be equal to each other. That is, the reference signals for estimating the frequency offset allocated to bandwidth parts different form each other may be allocated in an aligned state.

The reference signals for estimating the frequency offset may be allocated to one or more identical subcarriers, and be allocated to symbols different from each other in the identical subcarriers.

At this time, an interval between the different symbols in the identical subcarriers, allocated to the reference signals for estimating the frequency offset, may be shorter than coherence time.

For example, if the maximum coherence time is derived as 10 symbols, an interval between two symbols allocated to the reference signals for estimating the frequency offset may be shorter than 10 symbols, and the reference signals for estimating the frequency offset may be allocated at the interval of 3 symbols or 4 symbols.

Alternatively, a pattern of the reference signals for estimating the frequency offset may be configured in a specific pattern for each cell.

That is, since a collision may occur if all base stations transmit reference signals at the same time in the same location, it is possible to transmit reference signals with a specific pattern per cell. For example, the reference signals for estimating the frequency offset may be configured with a specific pattern determined based on a cell ID.

At this time, the UE may recognize the pattern of the reference signals for estimating the frequency offset based on the cell ID, or the base station may transmit configuration information of the reference signals for estimating the frequency offset to the UE through broadcasting or RRC signaling.

Accordingly, in accordance with at least one embodiment of the present disclosure, it is possible to estimate a frequency offset using reference signals transmitted through one or more resources other than a resource for transmitting the synchronization signal in new wireless communication systems.

In addition, in a case where the entire bandwidth is divided into one or more bandwidth parts, specific methods are provided of allocating reference signals for estimating the frequency offset. Therefore, it is possible to support the design of reference signals for estimating the frequency offset in a flexible frame structure.

Referring to FIG. 13, in wireless communication systems according to at least one embodiment of the present disclosure, the UE receives a synchronization signal through a first bandwidth part of one or more bandwidth parts configured by dividing an entire bandwidth into one or more bandwidth parts (S1300).

The UE receives one or more reference signals for estimating a frequency offset, which are allocated to one or more resources other than a resource for configuring the synchronization signal (S1310).

These reference signals for estimating the frequency offset may be allocated to one or more time intervals identical to or adjacent to a time interval for configuring the synchronization signal, and they may be allocated to the entire band of one or more bandwidth parts to which the reference signals are allocated.

In addition, the reference signals for estimating the frequency offset may be allocated to one or more second bandwidth parts other than the first bandwidth part. At this time, at least one of the location of each start symbol and the location of each last symbol of the reference signals for estimating the frequency offset allocated to the bandwidth parts different from each other may be equal to each other.

The reference signals for estimating the frequency offset are allocated to different symbols from each other in one or more identical subcarriers, and an interval between the different symbols from each other may be shorter than coherence time. For example, the reference signals for estimating the frequency offset may be allocated at the interval of 3 symbols or 4 symbols.

Alternatively, the reference signals for estimating the frequency offset may be configured with a specific pattern per cell, such as, a specific pattern based on a cell ID. At this time, the UE may recognize the pattern of the reference signals based on the cell ID, or identify the pattern of the reference signals through configuration information of the reference signals transmitted from the base station.

The UE may estimate a frequency offset using the reference signals for estimating the frequency offset, which are received from the base station (S1320).

Accordingly, in accordance with at least one embodiment of the present disclosure, it is possible for the UE to estimate a frequency offset using reference signals allocated to one or more resources other than a resource for transmitting the synchronization signal in new wireless communication systems.

Figure 14:
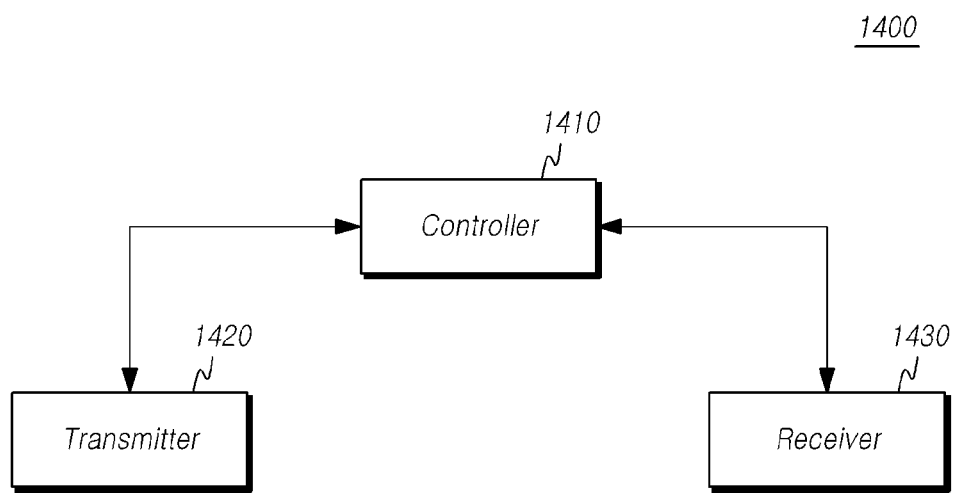
FIG. 14 is a block diagram illustrating a base station according to at least one embodiment of the present disclosure.

FIG. 14 is a block diagram illustrating a base station according to at least one embodiment of the present disclosure.

Referring to FIG. 14, a base station 1400 according to at least one embodiment of the present disclosure includes a controller 1410, a transmitter 1420, and a receiver 1430.

The controller 1410 is configured to support various numerologies of the NR according to the embodiments described above, and control overall operations of the base station 1400 in configuring one or more reference signals for estimating a frequency offset.

The transmitter 1420 and the receiver 1430 are used to transmit to and receive from a UE, signals, messages, and data necessary for carrying out the present disclosure described above.

Figure 15:
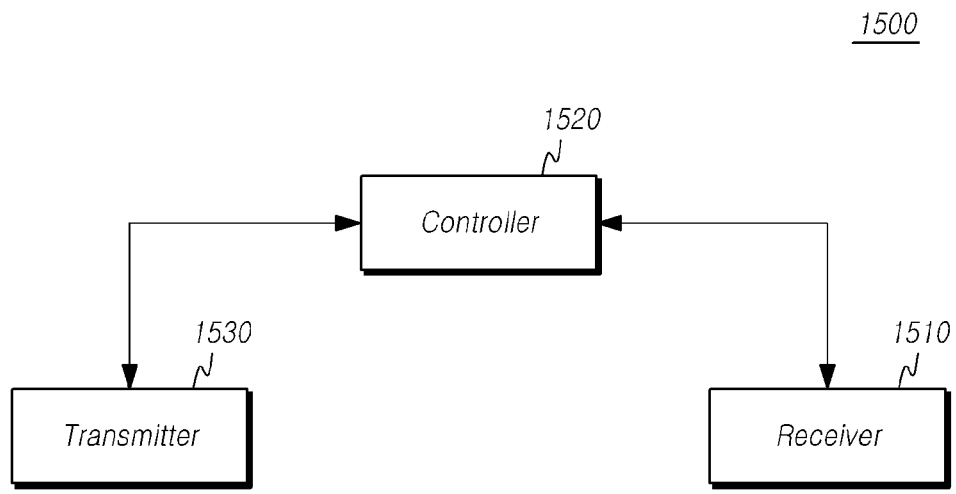
FIG. 15 is a block diagram illustrating a user equipment according to at least one embodiment of the present disclosure.

FIG. 15 is a block diagram illustrating a UE according to at least one embodiment of the present disclosure.

Referring to FIG. 15, a UE 1500 according to at least one embodiment of the present disclosure includes a receiver 1510, a controller 1520, and a transmitter 1530.

The receiver 1510 receives downlink control information and data, messages through a corresponding channel from a base station.

The controller 1520 is configured to support various numerologies of the NR according to the embodiments described above, and receive one or more reference signals for estimating a frequency offset and control overall operations of the UE 1500 in estimating the frequency offset.

The transmitter 1530 transmits uplink control information and data, messages through a corresponding channel to the base station.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

APPENDIX

[1] Ericsson, Huawei, "New SI proposal Study on Latency reduction techniques for LTE", RP-150465, Shanghai, China, Mar. 9-12, 2015.
[2] R2-155008, "TR 36.881 v0.4.0 on Study on Latency reduction techniques for LTE", Ericsson (Rapporteur)
[3] R1-160927, "TR 36.881-v0.5.0 on Study on Latency reduction techniques for LTE", Ericsson (Rapporteur)

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. A method of a base station for transmitting one or more reference signals for estimating a frequency offset in a new radio (NR) communication system, the method comprising:
configuring, by the base station, a synchronization signal to be transmitted through a first bandwidth part of one or more bandwidth parts, which are configured by dividing an entire bandwidth into the one or more bandwidth parts;
allocating, by the base station, the one or more reference signals for estimating the frequency offset on one or more resources in the first bandwidth part other than a resource in the first bandwidth part and used for configuring and transmitting the synchronization signal; and
transmitting the one or more reference signals for estimating the frequency offset to a user equipment (UE) when transmitting the synchronization signal.

2. The method according to claim 1, wherein the one or more reference signals for estimating the frequency offset are allocated to an entire band of the first bandwidth part.

3. The method according to claim 1, wherein the one or more reference signals for estimating the frequency offset are allocated to different symbols from each other in one or more identical subcarriers, and an interval between the different symbols is shorter than coherence time.

4. The method according to claim 3, wherein the interval between the different symbols allocated to the one or more reference signals for estimating the frequency offset is 3 or 4.

5. The method according to claim 1, further comprising:
transmitting configuration information of the one or more reference signals for estimating the frequency offset to a user equipment through user equipment-specific signaling or higher layer signaling.

6. A method of user equipment (UE) receiving one or more reference signals for estimating a frequency offset in a new radio (NR) communication system, the method comprising:
receiving, by the UE, a synchronization signal transmitted from a base station through a first bandwidth part of one or more bandwidth parts, which are configured by dividing an entire bandwidth into the one or more bandwidth parts;
receiving, by the UE, the one or more reference signals for estimating the frequency offset through one or more resources in the first bandwidth part other than a resource in the first bandwidth part for configuring and transmitting the synchronization signal; and
estimating the frequency offset using the one or more reference signals for estimating the frequency offset.

7. The method according to claim 6, wherein the one or more reference signals for estimating the frequency offset are allocated to an entire band of the first bandwidth part.

8. The method according to claim 6, wherein the one or more reference signals for estimating the frequency offset are allocated to different symbols from each other in one or more identical subcarriers, and an interval between the different symbols is shorter than coherence time.

9. The method according to claim 8, wherein the interval between the different symbols allocated to the one or more reference signals for estimating the frequency offset is 3 or 4.

10. The method according to claim 6, further comprising:
receiving configuration information of the one or more reference signals for estimating the frequency offset through user equipment-specific signaling or higher layer signaling.

11. A base station for transmitting one or more reference signals for estimating a frequency offset in a new radio (NR) communication system, the base station comprising:
a controller configured to configure a synchronization signal to be transmitted through a first bandwidth part of one or more bandwidth parts which are configured by dividing an entire bandwidth into the one or more bandwidth parts and allocate the one or more reference signals for estimating the frequency offset on one or more resources in the first bandwidth part other than a resource in the first bandwidth part and used for configuring and transmitting the synchronization signal; and
a transmitter configured to transmit the one or more reference signals for estimating the frequency offset to a user equipment (UE) when transmitting the synchronization signal.

12. The base station according to claim 11, wherein the one or more reference signals for estimating the frequency offset are allocated to an entire band of the first bandwidth part.

13. The base station according to claim 11, wherein the one or more reference signals for estimating the frequency offset are allocated to different symbols from each other in one or more identical subcarriers, and an interval between the different symbols is shorter than coherence time.

14. The base station according to claim 13, wherein the interval between the different symbols allocated to which the one or more reference signals for estimating the frequency offset is 3 or 4.

15. The base station according to claim 11, further comprising:
 transmitting configuration information of the one or more reference signals for estimating the frequency offset to a user equipment through user equipment-specific signaling or higher layer signaling.

* * * * *